US007054282B2

(12) United States Patent
Proctor et al.

(10) Patent No.: US 7,054,282 B2
(45) Date of Patent: May 30, 2006

(54) METHOD AND APPARATUS FOR POWER CONTROL ON A DISCONTINUOUS TRANSMISSION CHANNEL IN A CDMA SYSTEM

(75) Inventors: Lee Proctor, Cary, IL (US); Eric Tsou, Chicago, IL (US); Mark Hetherington, Crystal Lake, IL (US); John Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 384 days.

(21) Appl. No.: 10/306,091

(22) Filed: Nov. 27, 2002

(65) Prior Publication Data
US 2004/0100965 A1   May 27, 2004

(51) Int. Cl.
*H04B 7/185* (2006.01)

(52) U.S. Cl. ............. 370/318; 370/335; 370/342; 370/394; 370/474

(58) Field of Classification Search ............. 370/318, 370/335, 342, 394, 474
See application file for complete search history.

(56) References Cited

U.S. PATENT DOCUMENTS

| 6,496,706 B1 | 12/2002 | Jou et al. |
| 6,622,024 B1 | 9/2003 | Koo et al. |
| 6,731,606 B1 * | 5/2004 | Lin et al. ............. 370/252 |
| 6,763,244 B1 * | 7/2004 | Chen et al. ............. 455/522 |

FOREIGN PATENT DOCUMENTS

WO    WO 01/69870 A1    9/2001

* cited by examiner

*Primary Examiner*—Dang Ton
*Assistant Examiner*—Inder Pal Mehra

(57) ABSTRACT

A wireless communications system and methods therein uses information, such as frame sequence numbers to improve DCCH or SCH power control. The system includes a base transceiver station (BTS) (14) with a frame type determinator (32) for determining whether the recovered data frames are good, erased, or non-transmitted data frames. A selector distribution unit (SDU) (16) includes a frame type verification processing block (36) for verifying that the frame type determinations made by the frame type determinator are correct based on the sequence numbers from received good data frames, and a power control block (38) for transmitting subscriber device power control information based on frame type determination verifications made by the verification processing block.

24 Claims, 3 Drawing Sheets

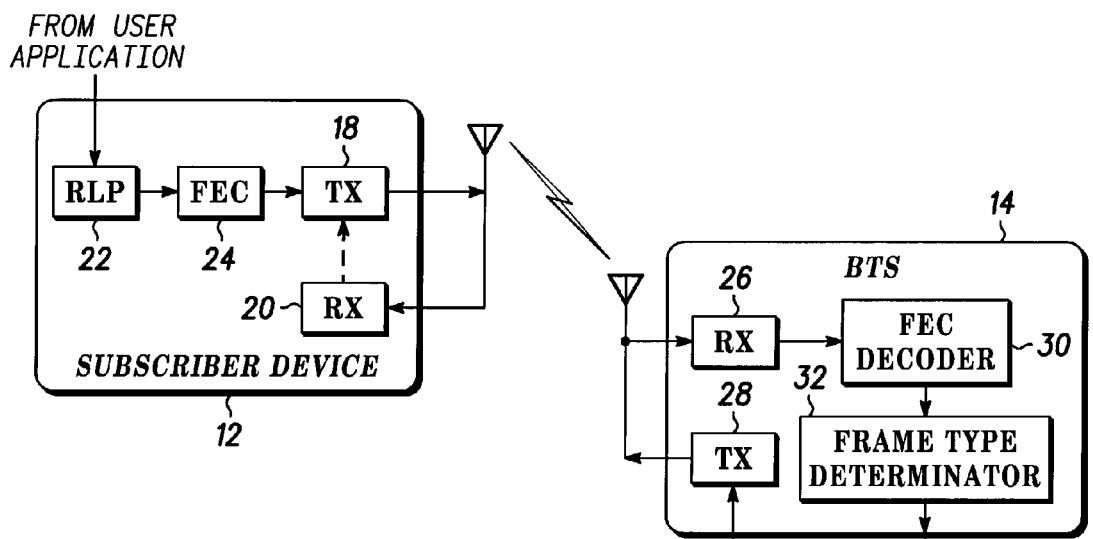
FIG. 1
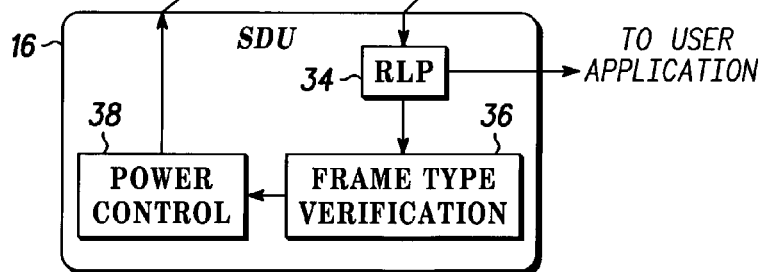

METHOD AND APPARATUS FOR POWER CONTROL ON A DISCONTINUOUS TRANSMISSION CHANNEL IN A CDMA SYSTEM

BACKGROUND OF THE INVENTION

1. Field of the Invention

The present invention relates to wireless communications, and specifically to improved power control and thus increased capacity for a Code Division Multiple Access (CDMA) channel using discontinuous transmission, such as a dedicated control channel (DCCH) or supplemental channel (SCH).

2. Description of Related Art

In current code division multiple access (CDMA) communications protocols, a dedicated control channel (DCCH) link is used primarily for data services communications such as file downloads/uploads, Internet access, and email functions. The DCCH channels and supplemental channels (SCHs) employ Discontinuous Transmission (DTX) technology or methodology whereby a transmitter is enabled and frames are transmitted over the air interface when there is information to send and the transmitter is turned off or disabled when there is no information to send. In a CDMA system, channel capacity, or in other words the number of calls that can be supported via the CDMA air interface, is inversely proportional to the collective transmitted power used by all transmitters, such as constituent subscriber devices. Thus, to maximize the number of active calls, it is important that each of the subscriber devices maintain a minimum transmission power level that is just suitable for maintaining adequate call or link quality.

To aid in maintaining such a minimum transmission power level and adequate call quality, a CDMA reverse DCCH link outer loop power control algorithm is typically implemented at, for example, a mobile switching office of a wireless service provider. The power control algorithm uses, along with other parameters, the determination of whether a transmitted DCCH frame is good, was erased or was never transmitted (DTXd) to control the outer loop threshold (OLT), which is a dynamic parameter that drives the reverse link power (e.g. subscriber transmitter power level) of the DCCH.

More specifically, upon reception of a good frame, the above power control algorithm adjusts the OLT as follows: OLT(N)=OLT(N−1) (RPC_Step_Down*Step_Down_Factor). In the above calculation, RPC_Step_Down is typically a fixed power value, and Step_Down_Factor is a function of the reverse frame erasure rate (FER) target and actual FER.

Upon reception of an erased frame, the above power control algorithm adjusts the OLT as follows: OLT(N)=OLT(N−1)+(RPC_Step_Up*Step_Up_Factor). In this calculation, RPC_Step_Up is typically a fixed power value, and Step_Up_Factor is a function of the reverse frame erase rate (FER) target and actual reverse FER.

Upon reception of a DTXd frame, a frame that was never transmitted, the power control algorithm does not make an adjustment. Thus for proper or accurate power control it is important to distinguish between an erased frame, namely one that could not be decoded or properly received due to channel induced errors, and a DTXd frame A DCCH rate determination algorithm (RDA), which is typically programmed into a service provider base transceiver station (BTS), actually makes the determination of whether a frame is good, erased or DTXd, and it relies on information similar to that relied on by a fundamental channel (FCH) multi-rate determination algorithm, such as cyclic redundancy checking (CRC) verification, symbol error rates and quality metrics. Although misdetermined frames on the FCH result in problems such as diminishment of audio quality and RLP (radio link protocol) aborts, they occur typically very infrequently and therefore do not significantly impact FCH power control.

However, the probability of a misdetermined frame on a DCCH is much greater due to the nature of discontinuous transmission frames and other limitations and shortcomings. This negatively impacts reverse link capacity, as the OLT and thus reverse channel average power is often increased when in fact it should be maintained at its current level. A similar negative impact occurs for frame misdeterminations on, for example, an IS-2000 supplemental channel (SCH).

Therefore, what is needed is a method and apparatus for improving power control performance and thus increasing channel capacity for a DCCH or SCH in a CDMA system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 is block diagram of an exemplary system operating environment in which dedicated control channel power control is executed;

DETAILED DESCRIPTION OF THE PRESENTLY PREFERRED EXEMPLARY EMBODIMENTS

Figure 2:
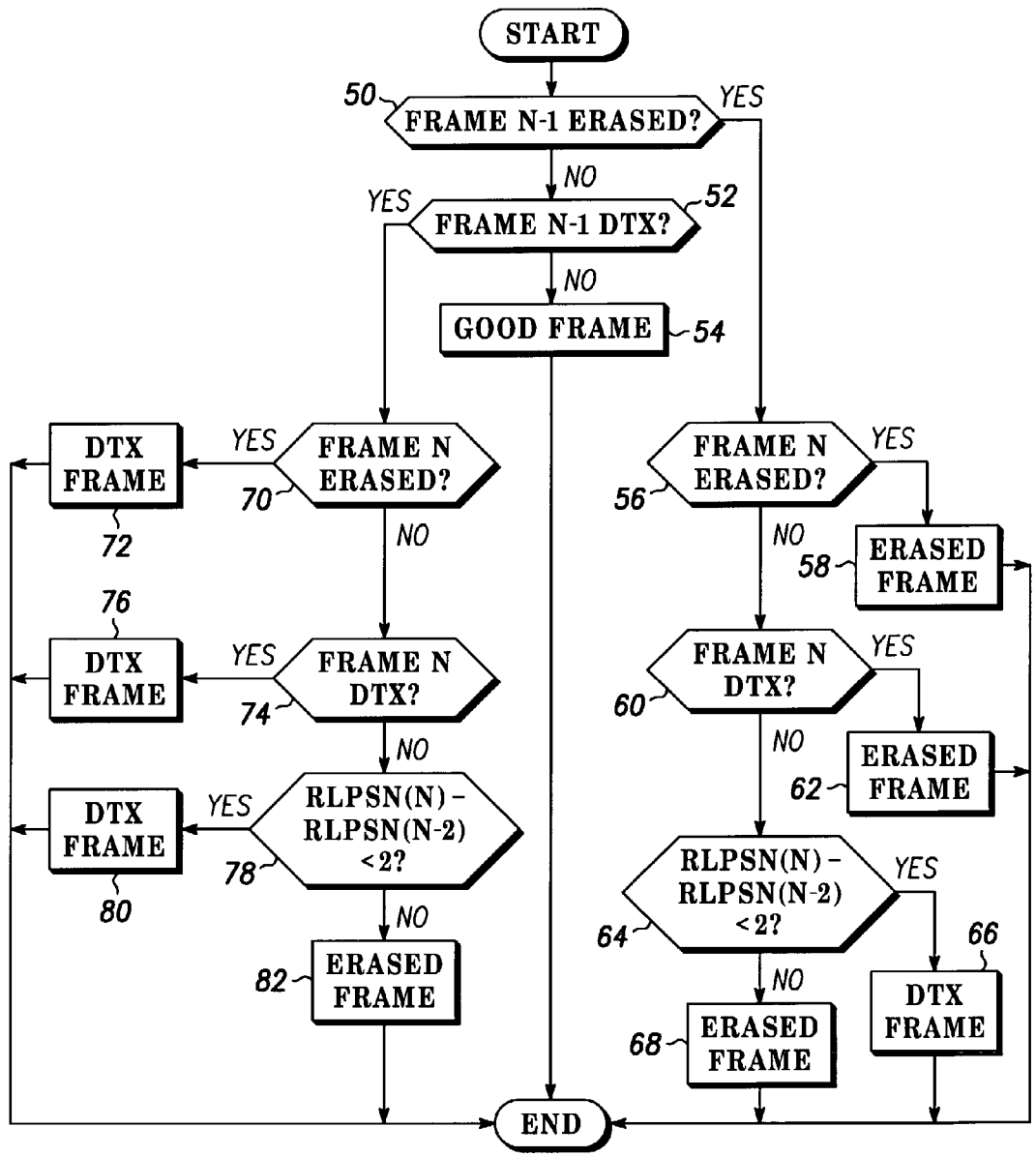
FIG. 2 is a flow diagram illustrating the methodology for dedicated control channel power control in more detail.

In overview, the present disclosure concerns systems, methods, and equipment or apparatus that provide communications services to users of such systems and equipment and specifically techniques for enhancing power control and thus capacity for discontinuous transmission channels, such as DCCH or SCH channels, in a code division multiple access system (CDMA). More particularly various inventive concepts and principles embodied in systems and methods therein for more accurately distinguishing erased versus never transmitted frames on such channels are discussed and described. By improving this accuracy one can avoid the debilitating impact on channel capacities otherwise due to resultant inaccuracies as applied to power control methodologies utilized for these channels. The systems of particular interest are CDMA system such as those defined by standards such as IS-95 and 95B, IS2000, and UMTS or wideband CDMA.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs and instructions or integrated circuits (ICs), such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and ICs with minimal experimentation. Therefore, in the interest of brevity and minimization of any risk of obscuring the principles and concepts according to the present invention, further discussion of such software, if any, will be limited to the essentials with respect to the principles and concepts used by the preferred embodiments.

Referring now to the drawings in which like numerals reference like parts, FIG. 1 shows an exemplary system environment including a mobile subscriber device (subscriber device) 12, a base transceiver station (BTS) 14 and a selector distribution unit (SDU) 16. The subscriber device 12 may be any type of code division multiple access (CDMA) wireless phone, data or messaging device that is capable of communicating with other like wireless devices or with public switched telephone network landline devices through the BTS 14 and the SDU 16 using a conventional wireless protocol such as IS-95, IS-95B, IS-2000 or UMTS.

As will be discussed below in more detail, the BTS 14 and the SDU 16 are configured to enable the CDMA dedicated control channel (DCCH) and/or supplemental channel (SCH) to be used for data services such as file downloads/uploads, Internet access, and email functions by increasing the accuracy of the outer loop threshold (OLT) and thus inbound power control through the use of radio link protocol (RLP) sequence numbers. The RLP sequence numbers are appended to end user data frames to significantly improve the integrity of end user data received by an end application such as an email server, the Internet or a personal computer (not shown) by enabling data sequencing to be performed and verified prior to the end application performing its own data integrity verification. The RLP sequence numbers can be used to determine when a data frame has been lost or erased, and to subsequently request retransmission of a lost frame.

The subscriber unit 12 includes numerous well known components, such as a voltage controlled oscillator, reference oscillator, loop filter, analog to digital converters and digital to analog converters that are not relevant to the present discussion and that are therefore not shown in FIG. 1. In addition to including a conventional transmitter 18 and receiver 20, the subscriber unit 12 includes an RLP generator 22 for receiving user data from a source application such as an external personal computer (not shown) or a mobile data application such as a wireless access protocol (WAP) browser (not shown), for framing data into RLP data frames (also referred to throughout more generally as data frames or frames) and for appending sequentially increasing RLP sequence numbers to the frames. The subscriber unit 12 also includes a forward error coding (FEC) processing block 24 including a convolutional or turbo coder (not shown) and a cyclic redundancy check (CRC) block for generating and applying overhead bits to the frames framed by the source application to provide for error protection of the frames (e.g. a receiver can perform error detection and correction on received frames) when the transmitter 18 transmits the frames over a wireless channel to the BTS 14. These frames are transmitted on channels utilizing discontinuous transmission (DTX) in which the transmitter 18 is turned on when there are frames to be transmitted and turned off when no frames need to be transmitted. Examples of such CDMA channels include a dedicated data control channel (DCCH) and/or a supplemental channel (SCH).

As with the subscriber unit 12, the BTS 14 includes numerous known components or elements that are not relevant to the present discussion and that are therefore not shown in FIG. 1. The BTS 14 also includes a receiver 26 for receiving the data frames transmitted from the subscriber device 12 in the form of digital bits, as well as a transmitter 28 for transmitting data to the subscriber unit 12. The receiver 26 passes the received digital bits to an FEC decoder 30, which is capable of detecting and correcting errors induced by the channel thereby recovering original input data, or in other words the original data bits and frames, even when a significant number of errors are present in the transmitted data. A frame type determinator 32 receives the decoded data frames as well as frame quality information such as symbol error rate (SER), cyclic redundancy check (CRC) results, and frame energy information included in the decoded data frames. From the frame quality information, a rate determination algorithm (RDA) programmed into the frame type determinator 32 determines whether the received frame is good or erased, or whether no frame was transmitted (DTXd).

A good data frame is a frame that was transmitted and received and properly decoded. An erased frame is a frame that was transmitted and either improperly received or improperly decoded and therefore needs to be retransmitted. For purposes of the present discussion, when a frame is not transmitted or the occurrence of a frame non-transmission will be referred to as a DTX frame. Unfortunately a receiver does not know whether a frame has been transmitted and thus all to often an erased frame and a DTX frame look identical to a receiver or decoder (e.g. can not be decoded). While the frame determinator or RDA can help distinguish between erased and blank or DTX frames present RDAs are inaccurate all to often, particularly given the large number of DTX frames that are expected. In any event, both the FEC decoder 30 and the frame type determinator 32 may be realized either through software algorithms programmed into BTS processing circuitry or through hardware, such as an application specific integrated circuit (ASIC), representative of the respective software algorithms.

The SDU 16, which is preferably implemented remotely from the BTS 14, such as in, or in proximity to, a base station controller (not shown) or in a centrally located switching office, includes an RLP receiver 34 for receiving recovered frames from the frame type determinator 32 if the recovered frames are good, as well as appended frame type indicators (good, erased, DTXd). The RLP receiver 34 reconstructs the original user data based on the RLP sequence numbers. If the RLP receiver 34 detects a missing sequence number it can request retransmission by sending or causing to be sent a NAK to the transmitter 18 of the subscriber unit 12. The RLP receiver 34 passes the good frames containing user data to a user application, such as the above-mentioned email server, Internet or personal computer (not shown) via intermediate circuitry such as, for example, a packet data services node modem (not shown). In addition, the RLP receiver 34 extracts the RLP sequence numbers from the received frames (good frames) and passes the RLP sequence numbers as well as outputs from the frame type determinator 32 to a frame type verification processing block 36.

As will be discussed below in more detail, the frame type verification processing block 36 is programmed to include a power control algorithm, or PCA, that verifies that the frame determination made by the rate determination algorithm, or RDA, in the frame type determinator 32 was correct, and then accordingly instructs a power control block 38 to transmit either a Step_Up or a Step_Down forward link power control message, referred to more generally as power control information, to the subscriber unit 12 through the BTS 14 depending on whether the frame is an erased frame or a good frame, respectively. The power control block 38 preferably indicates the Step_Up or Step_Down to the BTS 14 by appropriate adjustment of an Outer Loop Threshold (OLT). The BTS 14 uses the OLT to instruct the subscriber device 12 to increase or decrease or power up or down the reverse link transmitter power. If the frame type is a DTX frame, the frame type verification processing block 36 instructs the power control block 38 to transmit a power control message that indicates no adjustment in the OLT or change in the reverse link transmitter power to the subscriber unit 12. Thus a DTX frame that is erroneously called or characterized as an erased frame results in inaccurate power control, specifically increased inbound transmitter power levels, when it should not. This in turn results in lower inbound channel capacity.

Referring now to FIGS. 1 and 2, the methodology for DCCH power control implemented through the DCCH rate determination algorithm (RDA) and the power control algorithm (PCA) will now be discussed. Specifically, at 50, when a currently transmitted frame N is received at the frame type verification block 36, the PCA initially determines whether a first previously transmitted frame N-1 transmitted immediately prior to the currently transmitted frame N is an erased frame. If the PCA determines that the frame N-1 is not an erased frame, at 52 the PCA initially determines whether the frame N-1 is a DTX frame. If the frame N-1 is not a DTX frame, at 54 the PCA determines that the frame N-1 is a good frame, and the methodology ends which, for purposes of the present discussion, refers to the fact that the power control block 38 adjusts, or does not adjust, the outer loop threshold based on PCA determinations.

If at 50 the PCA initially determines that the frame N-1 is an erased frame, at 56 the PCA proceeds to determine whether the current frame N is an erased frame. If the PCA determines that the frame N is an erased frame, it declares at 58 that the frame N-1 is an erased frame as no information is available to contradict the original determination, and the methodology ends. If at 56 the PCA determines that the frame N is not an erased frame, at 60 it determines for verification purposes if the frame N is a DTX frame. If the PCA determines that the frame N is a DTX frame, it declares at 62 that the frame N-1 is an erased frame as no information is available to contradict the original determination, and the methodology ends.

If the PCA determines that the frame N is neither an erased frame nor a DTX frame, at 64 the PCA then determines whether a difference between RLP sequence numbers of the currently transmitted frame N and a second previously transmitted frame N-2 transmitted prior to the first previously transmitted frame N-1 is less than 2, assuming that the frames N and N-2 are good frames. At 66, the PCA declares that the first previously transmitted frame N-1 was a DTX frame if it determines that the difference between the RLP sequence numbers of N and N-2 is less than 2. Thus the PCA determines that the frame initially determined by the frame type determinator 32 to be an erased frame is actually a DTX frame if the difference between RLP sequence numbers of frames N and N-2 is 1.

If the PCA determines that the difference between the RLP sequence numbers of N and N-2 is not less than 2, then at 68 the PCA declares that the first previously transmitted frame N-1 is confirmed to be an erased frame, and the methodology subsequently ends. For example, in the case of a DCCH, the PCA determines that the frame N-1 initially determined by the RDA to be an erased frame is indeed an erased frame if the difference between RLP sequence numbers of frames N and N-2 is 2. However, in the case of, for example, an SCH in which a 16×SCH frame includes 8 RLP frames, the PCA determines that the frame N-1 initially determined by the RDA to be an erased frame is indeed an erased frame if the difference between RLP sequence numbers of frames N and N-2 is 9.

If at 52 the PCA initially determines that the previously transmitted frame N-1 is a DTX frame, at 70 the PCA proceeds to determine whether the current frame N is an erased frame. If the PCA determines that the frame N is an erased frame, it declares at 72 that the frame N-1 is indeed a DTX frame as no information is available to contradict the original determination, and the methodology ends. If however at 70 the PCA determines that the frame N is not an erased frame, at 74 it determines if the frame N is a DTX frame. If the PCA determines that the frame N is a DTX frame, it declares at 76 that the frame N-1 is indeed a DTX frame as no information is available to contradict the original determination, and the methodology ends.

If the frame N is neither an erased frame nor a DTX frame, at 78 the PCA then determines whether a difference between RLP sequence numbers of the currently transmitted frame N and a second previously transmitted frame N-2 transmitted prior to the first previously transmitted frame N-1 is less than 2, again assuming that the frames N and N-2 are good frames. At 80 the PCA verifies the frame N-1 is a DTX frame if it determines that the difference between the RLP sequence numbers of N and N-2 is less than 2. Alternatively, at 82 the PCA declares the frame N-1 is an erased frame if it determines that the difference between the RLP sequence numbers N and N-2 is greater than or equal to 2, and the methodology subsequently ends. The PCA can therefore increase frame verification accuracy, and therefore decrease a frame falsing rate, through the use of RLP frame sequence numbers by delaying verification for only one frame. This increased rate determination accuracy results in more accurate adjustment of the OLT and thus better power control management and increased channel capacity.

The PCA can further increase verification accuracy by delaying frame verification for more than one frame particularly when multiple sequential erased and/or DTXd frames occur. This further delay may decrease power control performance due to the resulting increased power control latency. However, the drawback associated with such a decrease may be significantly outweighed by the added power control accuracy that can be obtained by improving the frame type characterization accuracy.

Figure 3:
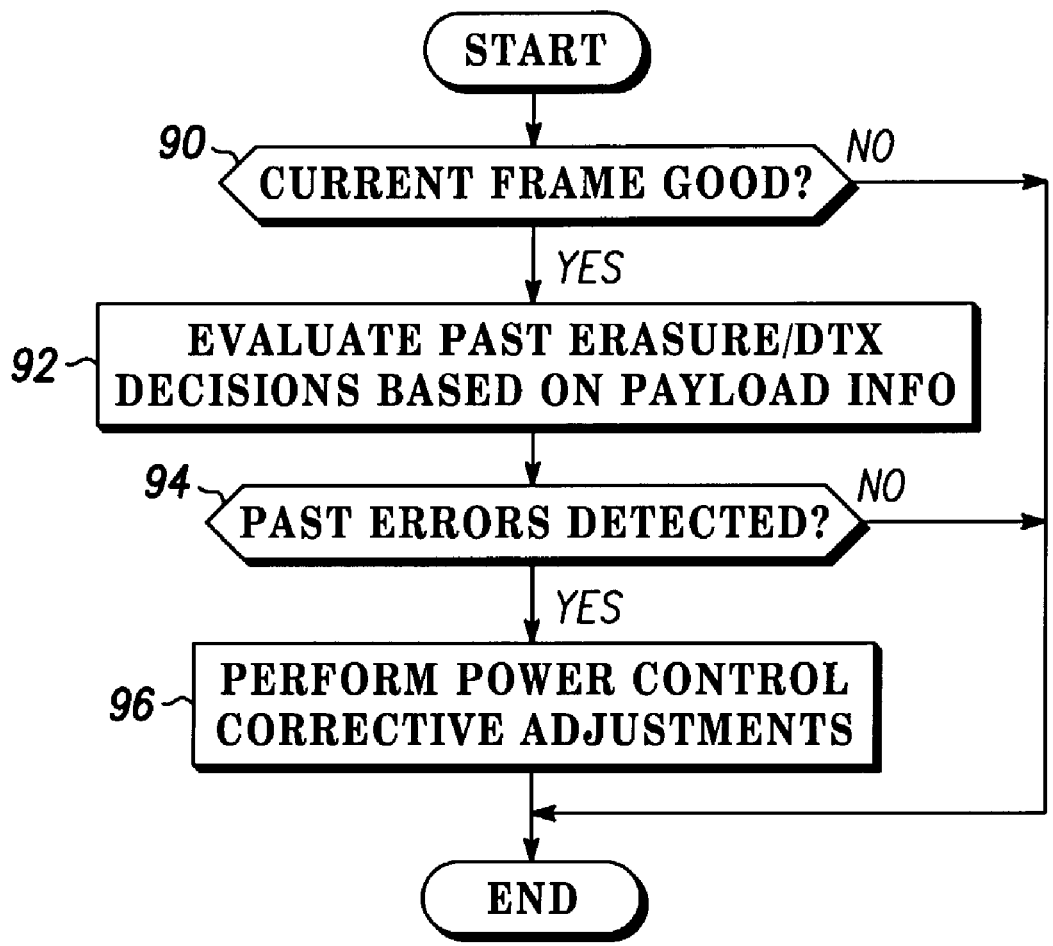
FIG. 3 is a flow diagram illustrating an enhancement to the dedicated control channel power control illustrated in FIG. 2.

Specifically, referring now to FIGS. 1 and 3, an example of DCCH power control implemented through the above-discussed PCA based on short term frame characteristics will be discussed. At 90, the PCA determines if a currently received frame N that is received at the frame type verification block 36 is a good frame. If the recovered frame N is not a good frame, the methodology ends. If, however, the PCA determines from the appended frame type indicators associated with the currently received frame N that it is a good frame, at 92 the PCA evaluates past erase/DTX decisions that it has made on previously transmitted frames based on the frame type indicators and payload information such as RLP sequence numbers. At 94, the PCA determines whether past frame type falsing errors have occurred. If, not, then the methodology ends. If however, such errors have occurred, at 96 the PCA instructs the power control processing block 38 to perform a power control corrective adjustments at the subscriber unit 12 as discussed above based on how many past errors it detects. For example if two frames have been initially characterized as erased frames that are subsequently determined to be DTX frames the proper subscriber unit power control should be reduced twice from the levels resulting from the false erasure characterizations. The methodology then ends until another frame is received.

Therefore, upon the occurrence of sequential bursts of mostly erased or DTX frames, and therefore no RLP sequence numbers to use for verification purposes, the PCA is preferably programmed to make a best estimate based on short-term frame type transmission characteristics. For example, in IS-2000 it is unusual, although not disallowed, for a subscriber device to turn off a transmitter (DTX) for just one frame in the middle of a data transmission. Thus, if previously transmitted frames N−3 and N−2 and currently transmitted frame N are erased frames, and previously transmitted frame N−1 is detected as a DTX frame, the PCA can use its corrective logic to make a best estimate determination that the previously transmitted frame N−1 is an erased frame.

Once RLP sequence numbers have resumed, or in other words good frames are again received, the PCA can then determine whether any of the best estimate determinations made during a preceding burst of erased frames or DTX frames are incorrect, and the power control block 38 can then send appropriate power control adjustment messages to the subscriber unit 12. For example, if a previously transmitted frame N−5 is a good frame, previously transmitted frames N−4 through N−1 are determined to be erased frames as discussed above and the difference between the RLP sequence number for a subsequently transmitted good frame N and the RLP sequence number for the previously transmitted frame N−5 is equal to 2 for a six frame sequence or time period, an initial determination of 4 erased frames results in 4 power control step up commands from the power control block 38. However, upon reception of the RLP sequence number for the currently transmitted frame N, the PCA can determine that 2 of the erased frames were probably DTX frames if the difference in sequence numbers only increases by 2 rather than an expected increase of 4. As a result, the power control processing block 38 can then send appropriate power control adjustment messages to the subscriber unit 12.

It should be noted that the DCCH power control implemented through the DCCH PCA discussed above in connection with FIGS. 2 and 3 is also applicable to 1×supplemental channels (SCH) and an IS-95B supplemental code channel (SCCH). Specifically, for a 1×SCH, a single air interface frame can contain multiple RLP frames, with the specific number being dependent on the transmission rate of the SCH. These supplemental channels are optionally transmitted simultaneously with a DCCH or FCH. The same RLP protocol is applied to the DCCH and the SCH. Thus if a DCCH contains a new data frame with RLP sequence number 5, the simultaneously transmitted SCH will contain RLP frames beginning with sequence number 6. The expected jump in RLP sequence numbers between consecutive DCCHs can be determined based on the SCH data rate to determine whether frames in the SCH were or were not DTX frames.

In the above discussed example referencing a 16×SCH frame that includes 8 RLP frames, the PCA determines that the currently received DCCH frame N is an erased frame. The corrective logic of the PCA then determines if the difference between the base RLP sequence number of the currently received SCH frame N and that of the last RLP sequence number of the previously received SCH frame N−1 is 1, or, more generally regarding FIG. 3, is less than 2. If so, then the PCA determines that the currently received DCCH frame was a DTX frame. If the PCA determines that the currently received frame N is a DTX frame, the corrective logic of the PCA then determines if the difference between the base RLP sequence number of the currently received SCH frame N and that of the last RLP sequence number of the previously received SCH frame N−1 is 2, or, more generally regarding FIG. 3 is greater than or equal to 2. If so, then the PCA determines that the currently received DCCH frame was an erased frame.

Thus, the DCCH power control implemented through the PCA can determine whether a frame on a DCCH was possibly a DTX frame or an erased frame based on the jump in RLP sequence numbers between consecutive SCHs, with it being understood by those skilled in the art that 100% accuracy in such determinations is not possible due to the presence of retransmitted frames and RLP control frames where the consecutive property of RLP sequence numbers is not maintained.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of controlling power on a communications channel, comprising:

receiving a first good frame prior to receiving a sequential burst of mostly one of erased frames and non-transmitted frames;

monitoring received frames until a second good frame is detected as a currently received frame;

evaluating past erased and non-transmitted frame type estimations made on previously received frames based on a difference in sequence numbers contained within the first and second good frames;

determining whether past frame type estimation errors have occurred based on evaluating of past erased and non-transmitted frame type estimations; and if frame type estimation errors have occurred, causing power control corrective adjustments to be made to compensate for the frame type estimation errors.

2. The method of claim 1, wherein the communications channel comprises a code division multiple access (CDMA) channel.

3. The method of claim 1, wherein the CDMA communication channel is at least one of dedicated control channel (DCCH), a supplemental (SCH) and supplemental code channel (SCCH).

4. The method of claim 1, wherein the sequence numbers are associated with a radio link protocol (RLP).

5. The method of claim 4, wherein the evaluating of past erased and non-transmitted frame type estimations made on previously received frames based an a difference in sequence numbers contained within the first and second good frames further comprises comparing one of a number of detected erased and non-transmitted frames to a difference in RLP sequence numbers between an RLP sequence number of the first good frame and the RLP sequence number of the second good frame.

6. The method of claim 1, further comprising:
prior to the monitoring of received frames until a second good frame is detected as a currently received frame, if all but one frame of the sequential burst of mostly one of erased frames and non-transmitted frames are detected as being erased frames, estimating that the one frame of the sequential burst of mostly erased frames or non-transmitted frames is also an erased frame.

7. The method of claim 1 further comprising:
prior to the monitoring of received frames until a second good frame is detected as a currently received frame, if all but one frame of the sequential burst of mostly one of erased frames and non-transmitted frames are detected as being non-transmitted, estimating that the one frame of the sequential burst of mostly erased frames or non-transmitted frames is also a non-transmitted frame.

8. The method of claim 1, wherein the sequential burst of mostly one of erased fames and non-transmitted frames comprises the first and second good frames and at least three frames transmitted immediately prior to the second good frame.

9. The method of claim 1, wherein the received frames are received across a plurality of transmission channels.

10. The method of claim 9 where the plurality of transmission channels further comprises CDMA transmission channels comprising at least two of a Fundamental Channel, dedicated control channel (DCCH), a supplemental channel (SCH) and a supplemental control channel (SCCH).

11. The method of claim 9, where the plurality of user transmission channels comprises of at least one DCCH and at least one SCCH.

12. A wireless communications system, comprising:
a base transceiver station (BTS) including a transceiver for facilitating communications with wireless subscriber devices over a communications channel, a decoder for recovering data frames transmitted frame one or more of the wireless subscriber devices, and a frame type determinator for determining whether each of the recovered data frames are one of a good, an erased, and a non-transmitted data frames; and
a selector distribution unit (SDU) for receiving recovered data frames from the frame type determinator as well as appended frame type indicators indicating one of good, erased and non-transmitted frame type determinations, for extracting radio link protocol (RLP) sequence numbers from the recovered data frames appended with good frame type indicators, for verifying that the frame type determinations are correct, and for providing subscriber device power control information based on frame type determination verifications.

13. The wireless communications system of claim 12, further including a frame type verification block for verifying that the frame type determinations are correct, the verifying based on the RLP sequence numbers from the recovered data frames appended with good frame type indicators.

14. The wireless communications system of claim 12, wherein the SDU is further for passing the recovered data frames appended with good frame type indicators to a user application.

15. The wireless communications system of claim 12, wherein the transceiver in the BTS is for facilitating communication over at least one of a dedicated control channel (DCCH) and a supplemental channel (SCH).

16. A method of controlling power on a communications channel comprising:
determining a first frame type of a first received frame as being one of an erased frame type and a non-transmitted frame type;
receiving a second received frame that is received after the first received frame;
verifying the first frame type based at least in part on the second received frame; and
increasing a transmission power if the first frame type is verified to be an erased frame type.

17. The method of claim 16 further comprising maintaining a transmission power if the first frame type is verified to be a non-transmitted frame type.

18. The method of claim 16 wherein the verifying the first frame type further comprises: comparing a sequence number associated with the second received frame to a sequence number associated with a previously received frame.

19. The method of claim 18 wherein the verifying the first frame type further comprises: verifying the first frame type is the erased frame type when the comparing identifies a missing sequence number.

20. The method of claim 19 further comprising verifying a number of erased frames corresponding to a number of missing sequence numbers.

21. The method of claim 16 wherein the verifying the first frame type further comprises:
determining a second frame type of the second received frame; and
comparing the second frame type of the second received frame with the first frame type.

22. The method of claim 21 wherein the verifying the first frame type further comprises:
comparing the first frame type with the frame type of a plurality of previously received frames.

23. The method of claim 21 wherein the verifying the first frame type further comprises verifying the first frame type as a non-transmitted frame when the frame type of the second received frame and a frame type of one or more previously received frames indicates non-transmitted frames.

24. The method of claim 21 wherein the verifying the first frame type further comprises verifying the first frame type as an erased frame when the frame type of the second received frame and a frame type of one or more previously received frames indicates erased frames.

* * * * *